(12) United States Patent
Alain Creutz et al.

(10) Patent No.: US 9,040,474 B2
(45) Date of Patent: May 26, 2015

(54) GRANULATED FOAM CONTROL COMPOSITION COMPRISING A POLYOL ESTER AND CATIONIC POLYMER

(75) Inventors: Serge Firmin Alain Creutz, Liege (BE); Jacqueline L'Hostis, Silly (BE); Haiyan Song, Beijing (CN); Ming Tang, Beijing (CN); Rajan Keshav Panandiker, West Chester, OH (US); Olivia DePaepe, Dour (BE)

(73) Assignee: DOW CORNING CORPORATION, Midland, MI (US)

( * ) Notice: Subject to any disclaimer, the term of this patent is extended or adjusted under 35 U.S.C. 154(b) by 165 days.

(21) Appl. No.: 13/991,663

(22) PCT Filed: Dec. 9, 2011

(86) PCT No.: PCT/CN2011/083753
§ 371 (c)(1),
(2), (4) Date: Sep. 20, 2013

(87) PCT Pub. No.: WO2012/075962
PCT Pub. Date: Jun. 14, 2012

(65) Prior Publication Data
US 2014/0024571 A1 Jan. 23, 2014

(30) Foreign Application Priority Data
Dec. 10, 2010 (CN) .............. 2010 0 02013

(51) Int. Cl.
| | | |
|---|---|---|
| C11D 9/36 | (2006.01) | |
| C11D 3/00 | (2006.01) | |
| B01D 19/04 | (2006.01) | |
| C11D 3/37 | (2006.01) | |

(52) U.S. Cl.
CPC .......... *C11D 3/0026* (2013.01); *B01D 19/0409* (2013.01); *B01D 19/0431* (2013.01); *C11D 3/3738* (2013.01)

(58) Field of Classification Search
USPC ................ 510/276, 317, 343, 347, 349, 466
See application file for complete search history.

(56) References Cited

U.S. PATENT DOCUMENTS

| | | |
|---|---|---|
| 4,639,489 A | 1/1987 | Aizawa et al. |
| 4,894,177 A | 1/1990 | Starch |
| 5,073,384 A | 12/1991 | Valentine et al. |
| 5,238,596 A | 8/1993 | Smith |
| 5,456,855 A | 10/1995 | De Cupere |
| 5,668,101 A | 9/1997 | Kolaitis et al. |
| 5,861,368 A | 1/1999 | Kolaitis et al. |
| 6,162,781 A | 12/2000 | Buscan et al. |
| 6,165,968 A | 12/2000 | Lenoble |
| 7,135,451 B2 | 11/2006 | Corona, III et al. |
| 7,312,277 B2 | 12/2007 | Maes et al. |
| 7,407,991 B2 | 8/2008 | Creutz et al. |
| 7,632,890 B2 | 12/2009 | Creutz et al. |
| 7,807,725 B2 | 10/2010 | Nguyen-Kim et al. |
| 2004/0116316 A1* | 6/2004 | Michel et al. ............. 510/444 |
| 2009/0118399 A1 | 5/2009 | Benbakoura et al. |

FOREIGN PATENT DOCUMENTS

| | | |
|---|---|---|
| CN | 1674967 A | 9/2005 |
| CN | 1842552 A | 10/2006 |
| CN | 101258232 A | 9/2008 |
| DE | 4323410 A1 | 1/1995 |
| EP | 0094250 A1 | 11/1983 |
| EP | 0210731 A2 | 2/1987 |
| EP | 0217501 A2 | 4/1987 |
| EP | 1070526 A2 | 1/2001 |
| EP | 1075864 A2 | 2/2001 |
| GB | 667649 A | 3/1952 |
| GB | 1450580 A | 9/1976 |
| GB | 1523957 A | 9/1978 |
| JP | 10-306294 A | 11/1998 |
| JP | 11-158497 A | 6/1999 |
| WO | WO 95/02669 A1 | 1/1995 |
| WO | WO 99/56259 A1 | 11/1999 |
| WO | WO 03/089108 A1 | 10/2003 |
| WO | WO 20041018074 A1 | 3/2004 |
| WO | WO 20051021613 A1 | 3/2005 |
| WO | WO 20071008773 A2 | 1/2007 |
| WO | WO 20071028773 A1 | 3/2007 |
| WO | WO 20071137948 A1 | 12/2007 |
| WO | WO 20121076186 A2 | 6/2012 |

OTHER PUBLICATIONS

English language abstract for CN1674967 extracted from espacenet.com database on Apr. 10, 2014, 28 pages.
English language abstract for CN1842552 extracted from espacenet.com database on Apr. 10, 2014, 31 pages.
English language abstract for CN101258232 extracted from espacenet.com database on Apr. 10, 2014, 26 pages.
Machine-Assisted English translation for DE 4323410 extracted from the espacenet.com database on Aug. 5, 2013, 15 pages.
English language abstract and machine-assisted English translation for JP 10-306294 extracted from the PAJ database on Aug. 5, 2013, 40 pages.

(Continued)

*Primary Examiner* — Charles Boyer
(74) *Attorney, Agent, or Firm* — Howard & Howard Attorneys PLLC

(57) ABSTRACT

A granulated foam control composition comprises a foam control agent based on a polydiorganosiloxane fluid, an organic additive of melting point 45"1¤7C to 100° C. comprising a polyol ester, a water-soluble particulate inorganic carrier and a polymer having a net cationic charge. The mean number of carbon atoms in the organo groups of the polydiorganosiloxane fluid is at least 1.3. The foam control agent includes a hydrophobic filler dispersed in the polydiorganosiloxane fluid, and optionally an organosilicone resin. The polyol ester is miscible with the polydiorganosiloxane fluid.

15 Claims, No Drawings

(56) References Cited

OTHER PUBLICATIONS

English language abstract and machine-assisted English translation for JP 11-158497 extracted from the PAJ database on Aug. 5, 2013, 33 pages.

English language abstract for WO 2005/021613 extracted from the espacenet.com on Aug. 5, 2013, 33 pages.

English language abstract and machine-assisted English translation for WO 95/02669 extracted from the espacenet.com database on Jan. 3, 2014, 37 pages.

European Search Report for Application GB 1021170.4 dated Apr. 11, 2011.

International Search Report for Application No. PCT/EP2011/006224 dated Jun. 18, 2012, 4 pages.

International Search Report for Application No. PCT/CN2011/083753 dated Mar. 22, 2012, 4 pages.

* cited by examiner

GRANULATED FOAM CONTROL COMPOSITION COMPRISING A POLYOL ESTER AND CATIONIC POLYMER

RELATED APPLICATIONS

This application is the National Stage of International Patent Application No. PCT/CN2011/083753, filed on Dec. 9, 2011, which claims priority to and all the advantages of PCT International Patent Application No. PCT/CN2010/002013, filed on Dec. 10, 2010, the content of which is incorporated herein by reference.

This invention relates to silicone-based foam control compositions for use in aqueous compositions which are liable to foam. The foam control compositions of the invention can be added to detergent compositions, particularly detergent powders, to inhibit excessive foaming when the detergent is used in washing.

In some countries, washing laundry by hand is common practice. This process requires a lot of water, water that can be scarce or difficult to access. Hence developing suitable granulated antifoam that can be added in laundry detergent powder in order to reduce foam during the rinses would benefit consumers by reducing the number of rinses and thus water consumption. However in order not the change the consumers' habits, such granulated antifoam should not greatly reduce the foam generated during the washing steps. When washing by hand, or in washing machines which are not fully automatic so that the user sees separate washing and rinsing steps, the consumer expects to see foam during the washing step. The antifoam should be substantially more active in reducing foam during the rinsing step than during the washing steps.

EP-A-1075683 describes a foam control agent comprising (A) an organopolysiloxane material having at least one silicon-bonded substituent of the formula X-Ph, wherein X denotes a divalent aliphatic hydrocarbon group and Ph denotes an aromatic group, (B) a water-insoluble organic liquid, (C) an organosilicon resin and (D) a hydrophobic filler.

EP-A-1070526 describes a foam control agent which contains an polydiorganosiloxane with alkyl side chains in which each alkyl side chain contains from 9 to 35 carbon atoms, a finely divided hydrophobic particulate material, optionally an MQ organosilicon resin, and a stabilizing aid which is an organic compound having a melting point of from about 40 to 80° C., preferably a fatty acid, a fatty alcohol or an alkylphosphoric acid ester.

U.S. Pat. No. 7,632,890 describes a foam control composition comprising a polydiorganosiloxane fluid and an additive composition of melting point 35 to 100° C. comprising a non-polar polyol ester which is a polyol substantially fully esterified by carboxylate groups each having 7 to 36 carbon atoms. The polydiorganosiloxane fluid may be of the type described in EP-A-1075683 or of the type described in EP-A-1070526, with the mean number of carbon atoms in the organic groups attached to the polysiloxane being at least 1.3.

EP-A-210731 describes a particulate foam control agent comprising a silicone antifoam and an organic material having a melting point in the range 50-85° C. which comprises a monoester of glycerol and a 12-20C fatty acid, for example glyceryl monostearate, optionally in self-emulsifying form. The glyceryl monostearate is said not to affect the effectiveness of the silicone antifoam when it is released into the washing liquor. U.S. Pat. No. 5,238,596 describes a particulate foam control agent comprising a silicone antifoam and an organic material having a melting point in the range 45-85° C. which is a fatty acid, fatty alcohol or a monoester of glycerol and a 12-20C fatty acid, and a starch carrier.

WO 2007/08773 describes a solid silicone-releasing composition containing a cationic polymer that is cationic at pH of 7 and an active silicone ingredient, said cationic polymer and active silicone ingredient being mixed with each other prior to or during the formation of the solid composition. The solid silicone-releasing composition usually also comprises a thickener and a carrier. Granular encapsulated compositions can be prepared by using the solid silicone-releasing composition as a component in a laundry detergent powder, tablet or bar. This is particularly of interest for the delivery of silicone ingredients in the rinse cycle of a laundry operation.

GB-A-1523957 describes a foam control substance which comprises powdered or granular sodium tripolyphosphate, sodium sulphate or sodium perborate having on the surface thereof an organopolysiloxane antifoam agent which is at least partially enclosed within a mixture of a water insoluble wax having a melting point of 55-100° C. and a water insoluble emulsifying agent.

A granulated foam control composition according to the invention comprises:
(A) a foam control agent comprising
  (i) a polydiorganosiloxane fluid comprising units of the formula

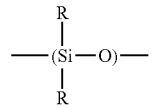

where each group R, which may be the same or different, is selected from an alkyl group having 1 to 36 carbon atoms or an aryl group or aralkyl group having up to 36 carbon atoms, the mean number of carbon atoms in the groups R being at least 1.3;
  (ii) a hydrophobic filler dispersed in the polydiorganosiloxane fluid; and
  (iii) optionally an organosilicon resin;
(B) an organic additive of melting point 45 to 100° C. comprising a polyol ester which is a polyol fully or partially esterified by carboxylate groups each having 7 to 36 carbon atoms and which is miscible with the polydiorganosiloxane fluid (A)(i);
(c) a water-soluble particulate inorganic carrier; and
(D) a polymer having a net cationic charge.

The invention also includes the use of such a granulated foam control composition to reduce foam during the rinsing step when the granulated foam control composition is incorporated in a laundry detergent powder.

A method according to the invention of manufacturing a granulated foam control composition comprises:
mixing
(A) a foam control agent comprising
  (i) a polydiorganosiloxane fluid comprising units of the formula

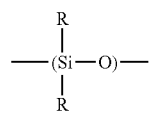

where each group R, which may be the same or different, is selected from an alkyl group having 1 to 36 carbon atoms or an aryl group or aralkyl group having up to 36 carbon atoms, the mean number of carbon atoms in the groups R being at least 1.3;

(ii) a hydrophobic filler dispersed in the polydiorganosiloxane fluid; and (iv) optionally an organosilicon resin; and (B) an organic additive of melting point 45° C. to 100° C. comprising a polyol ester which is a polyol fully or partially esterified by carboxylate groups each having 7 to 36 carbon atoms and which is miscible with the polydiorganosiloxane fluid (A)(i); and depositing the mixture of (A) and (B) on a water-soluble particulate inorganic carrier, the mixture of (A) and (B) being in non-aqueous liquid form prior to depositing it on the water-soluble particulate inorganic carrier; and depositing (D) a polymer having a net cationic charge on the water-soluble particulate inorganic carrier in conjunction with the mixture of (A) and (B) or subsequently.

The polydiorganosiloxane fluid (i) preferably has no more than 5 mole % branching units such as $RSiO_{3/2}$ units or crosslink sites, most preferably less than 2 mole % branching units. The mean number of carbon atoms in the groups R is preferably at least 1.3, and is more preferably at least 2.0, most preferably at least 2.5, if the groups R do not include aryl or aralkyl groups. The polydiorganosiloxane fluid is free from non-silicone polymer chains such as polyether chains.

One preferred example of a polydiorganosiloxane fluid is a polysiloxane comprising at least 10% diorganosiloxane units of the formula

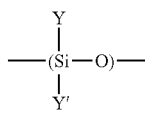

and up to 90% diorganosiloxane units of the formula

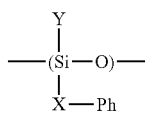

wherein X denotes a divalent aliphatic organic group bonded to silicon through a carbon atom; Ph denotes an aromatic group; Y denotes an alkyl group having 1 to 4 carbon atoms; and Y' denotes an aliphatic hydrocarbon group having 1 to 24 carbon atoms, as described in EP1075864. The diorganosiloxane units containing a —X-Ph group preferably comprise 5 to 60% of the diorganosiloxane units in the fluid. The group X is preferably a divalent alkylene group having from 2 to 10 carbon atoms, most preferably 2 to 4 carbon atoms, but can alternatively contain an ether linkage between two alkylene groups or between an alkylene group and -Ph, or can contain an ester linkage. Ph is most preferably a phenyl group, but may be substituted for example by one or more methyl, methoxy, hydroxy or chloro group, or two substituents on the Ph group may together form a divalent alkylene group, or may together form an aromatic ring, resulting in conjunction with the Ph group in e.g. a naphthalene group. A particularly preferred X-Ph group is 2-phenylpropyl —$CH_2$—CH($CH_3$)—$C_6H_5$. The group Y is preferably methyl but can be ethyl, propyl or butyl. The group Y' preferably has 1 to 18, most preferably 2 to 16, carbon atoms, for example ethyl, methyl, propyl, isobutyl or hexyl. Mixtures of alkyl groups Y' can be used, for example ethyl and methyl, or a mixture of dodecyl and tetradecyl. Other groups may be present, for example haloalkyl groups such as chloropropyl, acyloxyalkyl or alkoxyalkyl groups or aromatic groups such as phenyl bonded direct to Si.

The polysiloxane fluid (A)(i) containing —X-Ph groups may be a substantially linear siloxane polymer or may have some branching, for example branching in the siloxane chain by the presence of some tri-functional siloxane units, or branching by a multivalent, e.g. divalent or trivalent, organic or silicon-organic moiety linking polymer chains, as described in EP-A-1075684.

An alternative example of a preferred polydiorganosiloxane fluid is a polysiloxane comprising 50-100% diorganosiloxane units of the formula

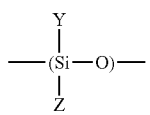

and optionally up to 50% diorganosiloxane units of the formula

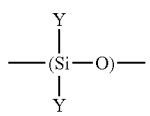

wherein Y denotes an alkyl group having 1 to 4 carbon atoms and Z denotes an alkyl group having 6 to 18 carbon atoms. The groups Y in such a polydiorganosiloxane are preferably methyl or ethyl. The alkyl group Z may preferably have from 6 to 12 or 14 carbon atoms, for example octyl, hexyl, heptyl, decyl, or dodecyl, or a mixture of dodecyl and tetradecyl.

It is preferred that the number of siloxane units (DP or degree of polymerisation) in the average molecule of the polysiloxane fluid of either of the above types is at least 5, more preferably from 10 to 5000. Particularly preferred are polysiloxanes with a DP of from 20 to 1000, more preferably 20 to 200. The end groups of the polysiloxane can be any of those conventionally present in siloxanes, for example trimethylsilyl end groups.

The polydiorganosiloxane fluid containing —X-Ph groups, or the polydiorganosiloxane fluid containing —Z groups, is preferably present as at least 80% by weight of the polysiloxane fluid content of the foam control composition, most preferably as 100% or more than 95% of the polysiloxane fluid.

The polydiorganosiloxane fluid (i) can alternatively be a polydiorganosiloxane in which the organic groups are substantially all alkyl groups having 2 to 4 carbon atoms, for example polydiethylsiloxane. Such polydiorganosiloxane fluids are however not preferred, since foam control agents based on them are less efficient in controlling foaming from laundry detergent powders than those described in EP-A-1075684.

The foam control composition contains a hydrophobic filler (ii) dispersed in the polydiorganosiloxane fluid. Hydrophobic fillers for foam control agents are well known and are particulate materials which are solid at 100° C., such as silica, preferably with a surface area as measured by BET measurement of at least 50 $m^2/g$. titania, ground quartz, alumina, an aluminosilicate, zinc oxide, magnesium oxide, a salt of an aliphatic carboxylic acids, a reaction product of an isocyanate with an amine, e.g. cyclohexylamine, or an alkyl amide such as ethylenebisstearamide or methylenebisstearamide. Mixtures of two or more of these can be used.

Some of the fillers mentioned above are not hydrophobic in nature, but can be used if made hydrophobic. This can be done either in situ (i.e. when dispersed in the polysiloxane fluid), or by pre-treatment of the filler prior to mixing with the polysiloxane fluid. A preferred filler is silica which is made hydrophobic. Preferred silica materials are those which are prepared by heating, e.g. fumed silica, or precipitation. The silica filler may for example have an average particle size of 0.5 to 50 µm, preferably 2 to 30 and most preferably 5 to 25 µm. It can be made hydrophobic by treatment with a fatty acid, but is preferably made hydrophobic by the use of methyl substituted organosilicon materials such as dimethylsiloxane polymers which are end-blocked with silanol or silicon-bonded alkoxy groups, hexamethyldisilazane, hexamethyldisiloxane or organosilicon resins containing $(CH_3)_3SiO_{1/2}$ groups and silanol groups. Hydrophobing is generally carried out at a temperature of at least 100° C. Mixtures of fillers can be used, for example a highly hydrophobic silica filler such as that sold under the Trade Mark 'Sipemat D10' can be used together with a partially hydrophobic silica such as that sold under the Trade Mark 'Aerosil R972'.

The amount of hydrophobic filler (A)(ii) in the foam control composition of the invention is preferably 0.5-50% by weight based on the polysiloxane fluid (A)(i), more preferably from 1 up to 10 or 15% and most preferably 2 to 8% by weight.

The foam control composition preferably contains an organosilicon resin (A)(iii) which is associated with the polydiorganosiloxane fluid. Such an organosilicon resin can enhance the foam control efficiency of the polysiloxane fluid. This is particularly true for polysiloxane fluids containing —X-Ph groups, as described in EP-A-1075684, and is also true for polysiloxane fluids containing —Z groups. In such polysiloxane fluids, the resin modifies the surface properties of the fluid.

The organosilicon resin (A)(iii) is generally a non-linear siloxane resin and preferably consists of siloxane units of the formula $R'_aSiO_{4-a/2}$ wherein R' denotes a hydroxyl, hydrocarbon or hydrocarbonoxy group, and wherein a has an average value of from 0.5 to 2.4. It preferably consists of monovalent trihydrocarbonsiloxy (M) groups of the formula $R''_3SiO_{1/2}$ and tetrafunctional (Q) groups $SiO_{4/2}$ wherein R" denotes a monovalent hydrocarbon group. The number ratio of M groups to Q groups is preferably in the range 0.4:1 to 2.5:1 (equivalent to a value of a in the formula $R'_aSiO_{4-a/2}$ of 0.86 to 2.15), more preferably 0.4:1 to 1.1:1 and most preferably 0.5:1 to 0.8:1 (equivalent to a=1.0 to a=1.33).

The organosilicon resin (A)(iii) is preferably a solid at room temperature. The molecular weight of the resin can be increased by condensation, for example by heating in the presence of a base. The base can for example be an aqueous or alcoholic solution of potassium hydroxide or sodium hydroxide, e.g. a solution in methanol or propanol. A resin comprising M groups, trivalent $R''SiO_{3/2}$ (T) units and Q units can alternatively be used, or up to 20% of units in the organosilicon resin can be divalent units $R''_2SiO_{2/2}$. The group R" is preferably an alkyl group having 1 to 6 carbon atoms, for example methyl or ethyl, or can be phenyl. It is particularly preferred that at least 80%, most preferably substantially all, R" groups present are methyl groups. The resin may be a trimethyl-capped resin.

The organosilicon resin (A)(iii) is preferably present in the antifoam at 1-50% by weight based on the polysiloxane fluid (A)(i), particularly 2-30% and most preferably 4-15%. The organosilicon resin may be soluble or insoluble in the polysiloxane fluid. If the resin is insoluble in the polysiloxane fluid, the average particle size of the resin may for example be from 0.5 to 400 µm, preferably 2 to 50 µm.

The organic additive (B) of melting point of 45° C. to 100° C. is miscible with the polydiorganosiloxane fluid (A)(i). By 'miscible', we mean that materials in the liquid phase (i.e., molten if necessary) mixed in the proportions in which they are present in the foam control composition do not show phase separation. This can be judged by the clarity of the liquid mixture in the absence of any filler or resin. If the liquids are miscible the mixture is clear and remains as one phase. If the liquids are immiscible the mixture is opaque and separates into two phases upon standing.

The organic additive (B) increases the foam control efficiency of the supported composition. We have found that additives of melting point at least 45° C. are particularly effective in increasing foam control efficiency in the rinse. Most preferably, the mixture of the organic additive (B) and the polydiorganosiloxane fluid (A)(i) has a melting point of 45° C. to 100° C.

The organic additive (B) comprises a polyol ester which is a polyol partially or fully esterified by carboxylate groups each having 7 to 36 carbon atoms. The polyol ester is preferably a glycerol ester or an ester of a higher polyol such as pentaerythritol or sorbitol. The polyol ester is preferably a monocarboxylate or polycarboxylate (for example a dicarboxylate, tricarboxylate or tetracarboxylate) in which the carboxylate groups each having 18 to 22 carbon atoms. Such polyol carboxylates tend to have a melting point at least 45° C. The polyol ester can be a diester of a glycol such as ethylene glycol or propylene glycol, preferably with a carboxylic acid having at least 14 carbon atoms, more preferably having 18 to 22 carbon atoms, for example ethylene glycol distearate. Examples of preferred glycerol esters include glycerol tristearate and glycerol esters of saturated carboxylic acids having 20 or 22 carbon atoms such as the material of melting point 54° C. sold under the Trade Mark 'Synchrowax HRC', believed to be mainly triglyceride of $C_{22}$ fatty acid with some $C_{20}$ and $C_{18}$ chains. Alternative suitable polyol esters are esters of pentaerythritol such as pentaerythritol tetrabehenate and pentaerythritol tetrastearate.

The polyol ester can contain fatty acids of different chain length, which is common in natural products. The organic additive (B) can be a mixture of polyol esters, for example a mixture of esters containing different carboxylate groups such as glycerol tripalmitate and glycerol tristearate, or glycerol tristearate and Synchrowax HRC, or ethylene glycol distearate and Synchrowax HRC.

The organic additive (B) of melting point of 45 to 100° C. can also comprise a more polar polyol ester. Preferred polar polyol esters include partially esterified polyols including monoesters or diesters of glycerol with a carboxylic acid having 8 to 30 carbon atoms, for example glycerol monostearate, glycerol monolaurate, glycerol distearate or glycerol monobehanate. Mixtures of monoesters and diesters of glycerol can be used. Partial esters of other polyols are also useful, for example propylene glycol monopalmitate, sorbitan monostearate or ethylene glycol monostearate.

The organic additive (B) is preferably present in the granulated foam control composition at 10-200% by weight based on the polydiorganosiloxane fluid (A)(i), most preferably at 20 up to 100 or 120% based on the polydiorganosiloxane fluid.

The polymer having a net cationic charge is a cationic or amphoteric polymer. The amphoteric polymers of the present invention will have a net cationic charge, i.e. the total cationic charges on these polymers will exceed the total anionic charge. The cationic charge density of the polymer ranges from about 0.05 milliequivalents/g to about 12 milliequivalents/g. The charge density is calculated by dividing the number of net charge per repeating unit by the molecular weight of the repeating unit. The positive charges can be on the backbone of the polymers or the side chains of polymers. For polymers with amine monomers, the charge density depends on the pH of the carrier. For these polymers, charge density is measured at a pH of 7. Preferably the charge density of the polymer ranges from about 0.05 milliequivalents/g to about 7 milliequivalents/g.

The weight-average molecular weight Mw of the cationic polymer is generally between 80,000 and 4,000,000, preferably from 100,000 or 200,000 up to 4,000,000 and even more preferably from 200,000 up to 1,500,000 or 2,000,000, as determined by size exclusion chromatography relative to polyethyleneoxide standards with RI detection. The mobile phase used is a solution of 20% methanol in 0.4M aqueous MEA, 0.1 M $NaNO_3$, 3% acetic acid on a Waters Linear Ultrahydrogel column, 2 in series. Columns and detectors are kept at 40° C. Flow is set to 0.5 mL/min.

The polymers having a net cationic charge which are most suitable for the present invention have a molecular weight and charge density which are inversely related. Lower charge density polymer usually is most suitable at a higher molecular weight, while higher charge density polymer usually is most suitable at a lower molecular weight. The present charged polymer has a cationicity parameter of up to 50 dalton meq/g, wherein the cationicity parameter is defined as the product of molecular weight as defined above and charge density as defined above divided by 1000 (Mw×CD/1000).

The polymer having a net cationic charge significantly enhances suppression of foam in the rinse compared to suppression of foam during the wash.

Nonlimiting examples of deposition enhancing agents are cationic or amphoteric polysaccharides, proteins and synthetic polymers. Cationic polysaccharides include but not limited to cationic cellulose derivatives, cationic guar gum derivatives, chitosan and derivatives and cationic starches. Cationic polysacchrides have a molecular weight from about 50,000 to about 4 million, preferably from about 100,000 or 200,000 up to 4,000,000.

One group of preferred cationic polysaccharides is shown in Formula I below:

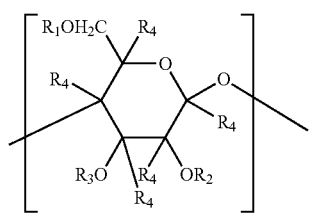

(I)

wherein $R^1$, $R^2$, $R^3$ are each independently H, $C_{1-24}$ alkyl (linear or branched),

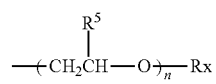

wherein n is from about 0 to about 10; Rx is H, $C_{1-24}$ alkyl (linear or branched) or

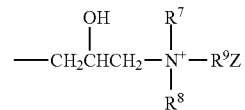

or mixtures thereof, wherein Z is a water soluble anion, preferably chloride, bromide, iodide, hydroxide, phosphate, sulfate, methyl sulfate and acetate; $R^5$ is selected from H, or $C_1$-$C_6$ alkyl or mixtures thereof; $R^7$, $R^8$ and $R^9$ are selected from H, or $C_1$-$C_{28}$ alkyl, benzyl or substituted benzyl or mixtures thereof.

$R^4$ is H or -$(P)_m$—H, or mixtures thereof; wherein P is a repeat unit of an addition polymer formed by a cationic monomer. In one embodiment, the cationic monomer is selected from methacrylamidotrimethylammonium chloride, dimethyl diallyl ammonium having the formula:

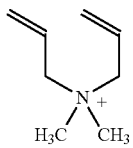

which results in a polymer or co-polymer having units with the formula:

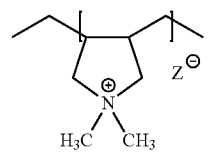

wherein Z' is a water-soluble anion, preferably chloride, bromide iodide, hydroxide, phosphate sulfate, methyl sulfate and acetate or mixtures thereof and m is from about 1 to about 100. Alkyl substitution on the saccharide rings of the polymer ranges from about 0.01% to 5% per sugar unit, more preferably from about 0.05% to 2% per glucose unit, on average in the polysaccharide.

Preferred cationic polysaccharides include cationic hydroxyalkyl celluloses. Examples of cationic hydroxyalkyl cellulose include those with the INCI name Polyquaternium10 such as those sold under the trade names Ucare Polymer JR 30M, JR 400, JR 125, LR 400 and LK 400 polymers; Polyquaternium 67 sold under the trade name Softcat SK™, all of which are marketed by Amerchol Corporation Edgewater N.J.; and Polyquaternium 4 sold under the trade name Celquat H200 and Celquat L-200 available from National Starch and Chemical Company, Bridgewater, N.J. Other preferred polysaccharides include Hydroxyethyl cellulose or hydroxypropylcellulose quaternized with glycidyl $C_{12}$-$C_{22}$ alkyl dimethyl ammonium chloride. Examples of such polysaccahrides include the polymers with the INCI names Polyquaternium 24 sold under the trade name Quaternium LM 200, PG-Hydroxyethylcellulose Lauryldimonium Chloride sold under the trade name Crodacel LM, PG-Hydroxyethylcellulose Cocodimonium Chloride sold under the trade name Crodacel QM and, PG-Hydroxyethylcellulose stearyldimonium Chloride sold under the trade name Crodacel QS and alkyldimethylammonium hydroxypropyl oxyethyl cellulose.

In one embodiment of the present invention, the cationic polymer comprises cationic starch. Cationic starches are described by D. B. Solarek in Modified Starches, Properties and Uses published by CRC Press (1986) and in U.S. Pat. No. 7,135,451, col. 2, line 33-col. 4, line 67. The cationic starch used in the present invention can for example comprise amylose at a level of from about 0% to about 70% by weight of the cationic starch. The cationic starch can for example comprise cationic maize starch, which comprises from about 25% to about 30% amylose by weight of the cationic starch. The remaining polymer in the above embodiments comprises amylopectin.

Further preferred polysaccahrides include cationic galactomannans, such as cationic guar gums or cationic locust bean gum. An example of cationic guar gum is a quaternary ammonium derivative of Hydroxypropyl Guar sold under the trade name Jaguar C13 or Jaguar Excel available from Rhodia, Inc of Cranburry N.J. or N-Hance by Aqualon, of Wilmington, Del.

A detailed description of synthetic cationic polymers can be found in an article by M. Fred Hoover that was published in the *Journal of Macromolecular Science-Chemistry*, A4(6), pp 1327-1417, October, 1970. The entire disclosure of the Hoover article is incorporated herein by reference. Examples of suitable cationic polymers are those used as retention aids in the manufacture of paper. They are described in "Pulp and Paper, Chemistry and Chemical Technology Volume III edited by James Casey (1981). The molecular weight of these polymers is in the range of 2,000 to 5,000,000. The synthetic cationic polymers of this invention will be better understood when read in light of the Hoover article and the Casey book.

Synthetic cationic polymers useful in the present invention include but are not limited to synthetic addition polymers of the general structure (II) below

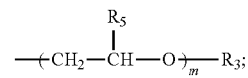
(II)

wherein $R^1$, $R^2$, and Z are defined herein below. Preferably, the linear polymer units are formed from linearly polymerizing monomers. Linearly polymerizing monomers are defined herein as monomers which under standard polymerizing conditions result in a linear or branched polymer chain or alternatively which linearly propagate polymerization. The linearly polymerizing monomers of the present invention have the formula:

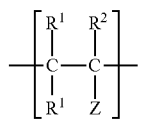

however, those of skill in the art recognize that many useful linear monomer units are introduced indirectly, inter alia, vinyl amine units, vinyl alcohol units, and not by way of linearly polymerizing monomers. For example, vinyl acetate monomers once incorporated into the backbone are hydrolyzed to form vinyl alcohol units. For the purposes of the present invention, linear polymer units may be directly introduced, i.e. via linearly polymerizing units, or indirectly, i.e. via a precursor as in the case of vinyl alcohol cited herein above.

In formula (II) above, each $R^1$ is independently hydrogen, $C_1$-$C_{12}$ alkyl, substituted or unsubstituted phenyl, substituted or unsubstituted benzyl, —$OR_a$, or —$C(O)OR_a$ wherein $R_a$ is selected from hydrogen, and $C_1$-$C_{24}$ alkyl and mixtures thereof; each $R^2$ is independently hydrogen, hydroxyl, halogen, $C_1$-$C_{12}$ alkyl, —$OR_a$, substituted or unsubstituted phenyl, substituted or unsubstituted benzyl, carbocyclic, heterocyclic, and mixtures thereof; each Z is independently hydrogen, halogen; linear or branched $C_1$-$C_{30}$ alkyl, nitrilo, $N(R_3)_2$—$C(O)N(R_3)_2$; —NHCHO (formamide); —$OR^3$, —$O(CH_2)_nN(R^3)_2$, —$O(CH_2)_nN^+(R^3)_3X^-$, —$C(O)OR^4$; —$C(O)N$—$(R^3)_2$—$C(O)O(CH_2)_nN(R^3)_2$, —$C(O)O(CH_2)_nN^+(R^3)_3X^-$, —$OCO(CH_2)_nN(R^3)_2$, —$(CH_2)_nN^+(R^3)_3X^-$, —$C(O)NH$—$(CH_2)_nN(R^3)_2$, —$C(O)NH(CH_2)_nN^+(R^3)_3X^-$, —$(CH_2)_nN(R^3)_2$, or —$(CH_2)_nN^+(R^3)_3X^-$, in which each $R_3$ is independently hydrogen, $C_1$-$C_{24}$ alkyl, $C_2$-$C_8$ hydroxyalkyl, benzyl; substituted benzyl and mixtures thereof; each $R_4$ is independently hydrogen or $C_1$-$C_{24}$ alkyl, and

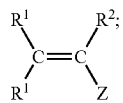

X is a water soluble anion; n is from 1 to 6; $R_5$ is independently hydrogen or $C_1$-$C_6$ alkyl, or mixtures thereof. Z can also be selected from non-aromatic nitrogen heterocycles comprising a quaternary ammonium ion, heterocycles comprising an N-oxide moiety, an aromatic nitrogen-containing heterocyclic wherein one or more or the nitrogen atoms is quaternized; an aromatic nitrogen-containing heterocycle wherein at least one nitrogen is an N-oxide; or mixtures thereof. Preferably $R^1$ is hydrogen, $C_1$-$C_4$ alkyl, or —$OR_a$, or $C(O)OR_a$ Preferred $R^2$ is hydrogen, $C_1$-$C_4$ alkyl, and mixtures thereof. Non-limiting examples of addition polymerizing monomers comprising a heterocyclic Z unit include 1-vinyl-2-pyrrolidinone, 1-vinylimidazole, quaternized vinyl imidazole, 4-vinyl-1-cyclohexene1,2-epoxide, and 2-vinylpyridine, 2-vinylpyridine N-oxide, 4-vinylpyridine N-oxide, 4-vinylpyridine 4-vinylpyridine N-oxide.

A non-limiting example of a Z unit which can be made to form a cationic charge in situ is the —NHCHO unit, formamide. The formulator can prepare a polymer or co-polymer comprising formamide units some of which are subsequently hydrolyzed to form vinyl amine equivalents.

The synthetic cationic polymers and co-polymers used in the present invention comprise Z units which have a cationic charge or which result in a unit which forms a cationic charge in situ. For example, at least one Z group per molecule may be selected from —$O(CH_2)_nN^+(R^3)_3X^-$, —$C(O)OR^4$; —$C(O)N$—$(R^3)_2$, —$C(O)O(CH_2)_nN(R^3)_2$, —$C(O)O(CH_2)_nN^+(R^3)_3X^-$, —$OCO(CH_2)_nN(R^3)_2$, —$OCO(CH_2)_nN^+(R^3)_3X^-$, —$C(O)NH$—$(CH_2)_nN(R^3)_2$, —$C(O)NH(CH_2)_nN(R^3)_3X^-$, —$(CH_2)_nN(R^3)_2$, —$(CH_2)_nN^+(R^3)_3X^-$, or a non-aromatic nitrogen heterocycle comprising a quaternary ammonium ion, heterocycle comprising an N-oxide moiety, an aromatic nitrogen containing heterocyclic wherein one or more or the nitrogen atoms is quaternized; an aromatic nitrogen containing heterocycle wherein at least one nitrogen is an N-oxide. When the co-polymers of the present invention comprise more than one Z unit, at least about 1% of the monomers which comprise the co-polymers will comprise a cationic unit.

The synthetic cationic polymers or co-polymers used in the present invention can comprise one or more cyclic polymer units which are derived from cyclically polymerizing monomers. Cyclically polymerizing monomers are defined herein as monomers which under standard polymerizing conditions result in a cyclic polymer residue as well as serving to linearly propagate polymerization. Preferred cyclically polymerizing monomers of the present invention have the formula:

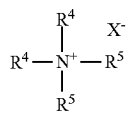

wherein each $R^4$ is independently an olefin comprising unit which is capable of propagating polymerization in addition to forming a cyclic residue with an adjacent $R^4$ unit; $R^5$ is $C_1$-$C_{12}$ linear or branched alkyl, benzyl, substituted benzyl, and mixtures thereof; X is a water soluble anion. Non-limiting examples of $R^4$ units include allyl and alkyl substituted allyl units. Preferably the resulting cyclic residue is a six-member ring comprising a quaternary nitrogen atom. $R^5$ is preferably $C_1$-$C_4$ alkyl, preferably methyl. An example of a cyclically polymerizing monomer is a dimethyl diallyl ammonium salt having the formula:

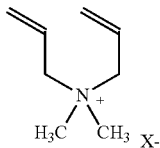

which results in a polymer or co-polymer having units with the formula:

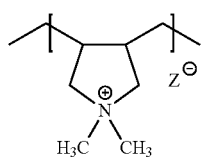

wherein the index z, which indicates the degree of polymerisation, is from about 10 to about 50,000.

Nonlimiting examples of preferred synthetic cationic polymers for use in the present invention include copolymers made from one or more cationic monomers selected from the group consisting of
a) N,N-dialkylaminoalkyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl acrylate, quaternized N,N-dialkylaminoalkyl acrylamide, quaternized N,N-dialkylaminoalkylmethacrylamide
b) vinylamine and its derivatives, allylamine and its derivatives,
c) vinyl imidazole, quaternized vinyl imidazole and diallyl dialkyl ammonium chloride.

Optionally the copolymer comprises a second monomer selected from a group consisting of acrylamide, N,N-dialkyl acrylamide, methacrylamide, N,N-dialkylmethacrylamide, $C_1$-$C_{12}$ alkyl acrylate, $C_{12}$-$C_{12}$ hydroxyalkyl acrylate, polyalkylene glycol acrylate, $C_1$-$C_{12}$ alkyl methacrylate, hydroxyalkyl methacrylate, glycol methacrylate, vinyl acetate, vinyl alcohol, vinyl formamide, vinyl acetamide, vinyl alkyl ether, vinyl pyridine, vinyl pyrrolidone, vinyl imidazole and derivatives, acrylic acid, methacrylic acid, maleic acid, vinyl sulfonic acid, styrene sulfonic acid, acrylamidopropylmethane sulfonic acid (AMPS) and their salts.

The polymer may optionally be cross-linked. Crosslinking monomers include, but are not limited to, ethylene glycol diacrylate, divinylbenzene, butadiene.

Preferred cationic monomers include N,N-dimethyl aminoethyl acrylate, N,N-dimethyl aminoethyl methacrylate (DMAM), [2-(methacryloylamino)ethyl]trimethylammonium chloride (QDMAM), N,N-dimethylaminopropyl acrylamide (DMAPA), N,N-dimethylaminopropyl methacrylamide (DMAPMA), acrylamidopropyl trimethyl ammonium chloride, methacrylamidopropyl trimethylammonium chloride (MAPTAC), quaternized vinyl imidazole and diallyldimethylammonium chloride and derivatives thereof. Preferred nonionic comonomers include acrylamide, N,N-dimethyl acrylamide, C1-C4 alkyl acrylate, C1-C4 hydroxyalkylacrylate, vinyl formamide, vinyl acetate, and vinyl alcohol. Most preferred nonionic monomers are acrylamide, hydroxyethyl acrylate (HEA), hydroxypropyl acrylate and derivatives thereof.

The most preferred synthetic polymers are poly(acrylamide-co-diallyldimethylammonium chloride), poly(acrylamide-methacrylamidopropyltrimethyl ammonium chloride), poly(acrylamide-co-N,N-dimethyl aminoethyl methacrylate), poly(acrylamide-co-N,N-dimethyl aminoethyl methacrylate), poly(hydroxyethylacrylate-co-dimethyl aminoethyl methacrylate), poly(hydroxypropylacrylate-co-dimethyl aminoethyl methacrylate), poly(hydroxypropylacrylate-co-methacrylamidopropyltrimethylammonium chloride), poly(acrylamide-co-diallyldimethylammonium chloride-co-acrylic acid), and poly(acrylamide-methacrylamidopropyltrimethyl ammonium chloride-co-acrylic acid).

Further alternative synthetic cationic polymers suitable for use in the present invention are polyethyleneimine and its derivatives. These are commercially available under the trade name Lupasol ex. BASF AG of Ludwigschaefen, Germany. In one embodiment, the polyethylene derivative is an amide derivative of polyetheyleneimine sold under the trade name Lupoasol SK. Also included are alkoxylated polyethleneimine; alkyl polyethyleneimine and quaternized polyethyleneimine.

Further alternative synthetic cationic polymers suitable for use in the present invention are polyamidoamine-epichlorohydrin (PAE) resins, which are condensation products of polyalkylenepolyamine with polycarboxylic acid further reacted with epichlorhydrin. The most common PAE resins are the condensation products of diethylenetriamine with adipic acid followed by a subsequent reaction with epichlorohydrin. They are available from Hercules Inc. of Wilmington Del. under the trade name Kymene or from BASF A.G. under the trade name Luresin. These polymers are described in 'Wet Strength resins and their applications' edited by L. L. Chan, TAPPI Press (1994).

The foam control agent is supported on a water-soluble particulate inorganic carrier, forming a granulated foam control composition which can readily be incorporated in a detergent powder. Examples of soluble inorganic carriers and/or supports are phosphates, for example powdered or granular sodium tripolyphosphate, sodium sulphate, sodium carbonate, for example anhydrous sodium carbonate or sodium carbonate monohydrate, sodium silicate, sodium citrate, sodium acetate, sodium sesquicarbonate and sodium bicarbonate. The particle size of the water-soluble inorganic carrier is preferably in the range 1 to 40 μm, more preferably from 1 up to 20 or 30 μm.

We have found that the use of a water-soluble particulate inorganic carrier markedly improves the performance of the granulated foam control composition of the present invention compared to a water-insoluble carrier. In particular, the granulated foam control compositions comprising a water-soluble particulate carrier are more effective in reducing foam in the rinse stage. Insoluble carriers such as zeolites, for example Zeolite A or Zeolite X, other aluminosilicates or silicates such as magnesium silicate are not suitable for the present invention.

The foam control agent (A) comprising polysiloxane fluid (i) containing the hydrophobic filler (ii) and optionally the organosilicon resin (iii) is preferably mixed with the organic additive (B) and the mixture is deposited on the carrier particles in non-aqueous liquid form. The cationic polymer (D) can be deposited on the carrier particles in conjunction with the mixture of (A) and (B) or subsequently. If the cationic polymer (D) is deposited on the carrier particles in conjunction with the mixture of (A) and (B), it can be premixed with (A) and (B) or deposited on the carrier particles simultaneously with the mixture of (A) and (B). The cationic polymer (D) is generally deposited in liquid form, for example from an aqueous solution or dispersion.

The mixture of (A) and (B) is preferably deposited on the carrier particles at a temperature at which the organic additive (B) is liquid, for example a temperature in the range 45-100° C. As the mixture cools on the carrier particles, it solidifies to a structure which contributes to the increased efficiency of the foam control composition. The supported foam control composition is preferably made by an agglomeration process in which the foam control composition comprising the foam control agent (A) and the organic additive (B) is sprayed onto the carrier particles while agitating the particles. The particles are preferably agitated in a high shear mixer through which the particles pass continuously.

One type of suitable mixer is a vertical, continuous high shear mixer in which the foam control composition is sprayed onto the particles. One example of such a mixer is a Flexomix mixer supplied by Hosokawa Schugi.

Alternative suitable mixers which may be used include horizontal high shear mixers, in which an annular layer of the powder-liquid mixture is formed in the mixing chamber, with a residence time of a few seconds up to about 2 minutes. Examples of this family of machines are pin mixers (e.g. TAG series supplied by LB, RM-type machines from Rubberg-Mischtechnik or pin mixers supplied by Lodige), and paddle mixers (e.g. CB series supplied by Lodige, Corimix (Trade Mark) from Drais-Manheim, Conax (Trade Mark) machines from Ruberg Mischtechnik).

Other possible mixers which can be used in the process of the invention are Glatt granulators, ploughshare mixers, as sold for example by Lodige GmbH, twin counter-rotating paddle mixers, known as Forberg (Trade Mark)-type mixers, intensive mixers including a high shear mixing arm within a rotating cylindrical vessel, such as "Typ R" machines sold by Eirich, Zig-Zag (Trade Mark) mixers from Patterson-Kelley, and HEC (Trade Mark) machines sold by Niro.

Another possible granulation method is fluidized bed. Examples of fluid bed granulation machines are Glatt fluidized bed and Aeromatic/Niro fluidized bed units. In fluidized bed, agglomeration take place by atomizing the liquid dispersion (solution, suspension or emulsion) onto the suspended bed of particles to make the granules.

The granules produced according to the invention generally have a mean particle diameter of at least 0.1 mm, preferably over 0.25 or 0.5 mm, up to a mean diameter of 1.2 or 1.5 or even 2 mm. We have found that granules according to the invention of this particle size, particularly 0.5 to 1 mm, have good flow properties and resistance to compaction.

The granulated foam control compositions of the invention can contain additional ingredients such as a density adjuster, a colour preservative such as a maleate or fumarate, e.g. bis(2-methoxy-1-ethyl) maleate or diallyl maleate, an acetylenic alcohol, e.g. methyl butynol, or cyclooctadiene, a thickening agent such as carboxymethyl cellulose, polyvinyl alcohol or a hydrophilic or partially hydrophobed fumed silica, or a colouring agent such as a pigment or dye.

The granulated foam control compositions of the invention are typically added to detergent powders at 0.1 to 10% by weight, preferably 0.2 to 0.5 or 1.0%. The detergent compositions may for example be those having high levels of anionic surfactants, e.g. sodium dodecyl benzene sulphonate. The granulated foam control compositions of the invention were found to have a minimum impact on the foam during the wash (for example less than 20% foam reduction) while greatly impacting the foam in the first rinse (for example more than 50% foam reduction). This was found true when laundering by hand but also when using semi-automatic machines.

The invention is illustrated by the following Examples in which parts and percentages are by weight.

EXAMPLE 1

6% by weight Sipernat (Trade mark) D10 treated precipitated silica and 1% R972 partially hydrophobic silica (both supplied by Evonik) were dispersed in 86.3% polydiorganosiloxane fluid having a degree of polymerisation of 65 and comprising 80 mole % methyl dodecyl siloxane groups, 20 mole % methyl 2-phenylpropyl (derived from [alpha]-methylstyrene) siloxane groups and 1 mole % divinyl crosslinking groups. 6.7% by weight of a 60% by weight solution of an organosiloxane resin having trimethyl siloxane units and $SiO_2$ units in a M/Q ratio of 0.65/1 in octyl stearate (70% solid) was added. The mixture was homogenised through a high shear mixer to form a foam control agent FC1.

14 parts by weight of the foam control agent FC1 was mechanically mixed with 9 parts of glyceryl monobehenate provided by Croda. The FC1 and molten glyceryl monobehenate were mixed at 80° C. The glyceryl monobehenate and polydiorganosiloxane fluid were miscible and the mixture had a melting point of 69° C. The mixture of glyceryl monobehenate and FC1, and 3 parts of a 1% aqueous solution of Polyquaternium-10/JR 30M cationic polymer, were poured slowly into a mixer where 78 parts of sodium sulfate powder was already being stirred. Polyquaternium-10/JR 30M is provided by Dow and is a polymeric quaternary ammonium salt formed by reacting hydroxyethyl cellulose with a trimethyl ammonium substituted epoxide, and has a Mw of 800,000 and a charge density of 1.25 meq/g. The mixture was stirred continuously until a granular particulate material was obtained. The water contained in this granulated foam control composition was removed in a fluidized bed using air at 30° C.

EXAMPLE 2

14.5 parts by weight of the foam control agent FC1 was mechanically mixed with 9 parts of glyceryl tristearate provided by Oleon. The FC1 and molten glyceryl tristearate were mixed at 70° C. The glyceryl tristearate and polydiorganosiloxane fluid were miscible and the mixture had a melting point of 62° C. The mixture of glyceryl tristearate and FC1, and 3.5 parts of a 1% aqueous solution of Polyquaternium-10/JR 30M cationic polymer, were poured slowly into a mixer where 73 parts of sodium sulfate powder was already being stirred. The mixture was stirred continuously until a granular particulate material was obtained. The water contained in this granulated foam control composition was removed in a fluidized bed using air at 30° C.

EXAMPLE 3

12.5 parts by weight of the foam control agent FC1 was mechanically mixed with 9 parts of glyceryl tribehenate provided by Oleon. The FC1 and molten glyceryl tribehenate were mixed at 70° C. The glyceryl tribehenate and polydiorganosiloxane fluid were miscible and the mixture had a melting point of 65° C. The mixture of glyceryl tribehenate and FC1, and 5 parts of a 6.2% aqueous solution of a cationic polymer CP1, were poured slowly into a mixer where 75 parts of sodium sulfate powder was already being stirred. The cationic polymer CP1 is a copolymer of polyacrylamide and methacrylamidopropyl trimethylammonium chloride. The mixture was stirred continuously until a granular particulate material was obtained. The water contained in this granulated foam control composition was removed in a fluidized bed using air at 30° C.

EXAMPLE 4

8 parts by weight of the foam control agent FC1 was mechanically mixed with 5 parts of glyceryl tristearate provided by Oleon. The FC1 and molten glyceryl tristearate were mixed at 70° C. The mixture of glyceryl tristearate and FC1, and 6.5 parts of a 6.2% aqueous solution of cationic polymer CP1, were poured slowly into a mixer where 73 parts of sodium sulfate powder was already being stirred. The mixture was stirred continuously until a granular particulate material was obtained. The water contained in this granulated foam control composition was removed in a fluidized bed using air at 30° C.

EXAMPLE 5

6% by weight Sipernat D10 silica and 1% R972 silica (both supplied by Evonik) were dispersed in 86.3% polydiorganosiloxane fluid having a degree of polymerisation of 65 and comprising 80 mole % methyl ethyl siloxane groups, 20 mole % methyl 2-phenylpropyl (derived from [alpha]-methylstyrene) siloxane groups and 1 mole % divinyl crosslinking groups. 6.7% by weight of a 60% by weight solution of an organosiloxane resin having trimethyl siloxane units and $SiO_2$ units in a M/Q ratio of 0.65/1 in octyl stearate (70% solid) was added. The mixture was homogenised through a high shear mixer to form a foam control agent FC2.

13.5 parts by weight of the foam control agent FC2 was mechanically mixed with 9 parts of glyceryl tribehenate provided by Oleon. The FC2 and molten glyceryl tristearate were mixed at 70° C. The glyceryl tribehenate and polydiorganosiloxane fluid were miscible and the mixture had a melting point of 65° C. The mixture of glyceryl tribehenate and FC2, and 4.5 parts of a 1% aqueous solution of Polyquaternium-10/JR 30M cationic polymer, were poured slowly into a mixer where 73.5 parts of sodium sulfate powder was already being stirred. The mixture was stirred continuously until a granular particulate material was obtained. The water contained in this granulated foam control composition was removed in a fluidized bed using air at 30° C.

COMPARATIVE EXAMPLE C1

Example 1 was repeated using 13 parts of the foam control agent FC1, 8.5 parts of the glyceryl monobehenate and 9.5 parts of the 1% solution of Polyquaternium-10. 69 parts of zeolite A supplied by Ineos were used in place of the sodium sulfate.

COMPARATIVE EXAMPLE C2

Example 1 was repeated using 12.5 parts of the foam control agent FC1, 8 parts of the glyceryl monobehenate and 68 parts of the sodium sulfate. 10.5 parts of an anionic acrylic/maleic copolymer provided by BASF under the name Sokalan® CP5 was used in place of the Polyquaternium-10 cationic polymer.

COMPARATIVE EXAMPLE C3

72 parts of Sodium sulfate were mixed with approximately 17 parts of FC2 and approximately 11 parts of a Polyquaternium-10/JR 30M solution at 0.75% (Polyquaternium-10 provided by Dow). The antifoam and the Polyquaternium-10 aqueous solution at 0.75% were mixed together using a 4-pitched blade stirrer. The obtained dispersion was poured slowly into a mixer where the Na sulfate was already present. The mixture was stirred continuously until a particulate material was obtained. The water contained in the granular material was removed in a fluidized bed using air at 35° C.

The granulated foam control compositions of Examples 1 to 5 and Comparative Examples C1 to C3 were tested using the following test protocol.

Add 2 litres of water to a basin, then add 7 g of detergent powder to the water. Then disperse the detergent powder for 2 minutes. Add 3 pieces of knitted cotton (total weight of 100 g), gently without disturbing the foam. Wait for 10 minutes. Then take 1 piece of cotton and scrub it for 5 times; wring the piece of cotton and remove from the basin. Repeat the same operation for the 2 other pieces. Measure the foam left in the basin with a ruler.

Rinse the basin and repeat the above procedure using 7 g of detergent powder to which 0.05 g of the granulated antifoam of the Example has been added. The ideal granulated antifoam should give a foam level which is as close as possible to the foam height achieved with the detergent alone.

Then rinse the basin and add 2 litres of water. Then add the fabric. Take 1 piece of cotton and scrub it 5 times; wring the piece of cotton and remove from the basin. Repeat for the 2 other pieces of cotton. Take a picture 5-10 sec after removing the last piece of fabric from the water, then measure the foam coverage on the rinse water surface. The ideal granulated antifoam should suppress the foam in this first rinse as much as possible.

The results of the test protocol are shown in Table 1

TABLE 1

|  | Foam height in basin | Rinse surface coverage |
| --- | --- | --- |
| Detergent alone | 6.9 cm | 100% |
| Example 1 | 6.7 cm | 10% |
| Example 2 | 6.5 cm | 10% |

TABLE 1-continued

|  | Foam height in basin | Rinse surface coverage |
|---|---|---|
| Example 3 | 6.9 cm | 20% |
| Example 4 | 6.4 cm | 15% |
| Example 5 | 6.0 cm | 20% |
| Comparative Example C1 | 6.6 cm | 100% |
| Comparative Example C2 | 5.9 cm | 80% |
| Comparative Example C3 | 4.1 cm | 15% |

It can be seen that the granulated foam control compositions of Examples 1 to 4 and Comparative Example C1 all had a minimum impact on the foam during the wash (less than 10% foam reduction). The granulated foam control composition of Comparative Example C2 had a small but significant impact on the foam during the wash (13% foam reduction). However Comparative Example C1 using an insoluble carrier for the granulated antifoam also had little or no impact on the foam in the rinse, whereas Examples 1 to 5 using a water-soluble carrier for the granulated antifoam all greatly reduced foam in the rinse.

The granulated foam control composition of Comparative Example C2 had a small but significant impact on the foam during the wash (14.5% foam reduction). However Comparative Example C2 using an anionic polymer in the granulated antifoam also had only a small impact on the foam in the rinse, whereas Examples 1 to 5 using a cationic polymer all greatly reduced foam in the rinse.

The granulated foam control composition of Comparative Example C3 had a major impact on the foam during the wash (40% foam reduction). In the absence of wax, release of antifoam in the wash is not suppressed.

EXAMPLE 6

9.5 parts by weight of the foam control agent FC1 was mechanically mixed with 6.5 parts of glyceryl tristearate provided by Sasol. The FC1 and molten glyceryl tristearate were mixed at 80° C. The glyceryl tristearate and polydiorganosiloxane fluid were miscible and the mixture had a melting point of 70° C. The mixture of glyceryl tristearate and FC1, and 4 parts of a 6.2% aqueous solution of a cationic polymer CP1, were poured slowly into a mixer where 80 parts of sodium sulfate powder heated at 70° C. was already being stirred. The mixture was stirred continuously until a granular particulate material was obtained. The water contained in this granulated foam control composition was removed in a fluidized bed using air at 30° C.

When tested according to the test protocol described in Examples 1 to 5, the detergent containing the granules of Example 6 showed a foam height in the wash of 95% of that given by detergent alone, and showed a foam coverage in the rinse of 20%.

EXAMPLES 7 TO 9

13.5 parts by weight of the foam control agent FC1 was mechanically mixed with 9 parts of molten glyceryl tribehenate at 70° C. The mixture of glyceryl tribehenate and FC1, and 4.5 parts of a 1% aqueous solution of a cationic polymer, were poured slowly into a mixer where 73.5 parts of sodium sulfate powder was already being stirred. The mixture was stirred continuously until a granular particulate material was obtained. The water contained in this granulated foam control composition was removed in a fluidized bed using air at 30° C.

The cationic polymers used in Examples 7 to 9 were:
Example 7—Polyquaternium-10/JR 30M described above
Example 8—Polyquaternium-10/LR 30M, which is a polymeric quaternary ammonium salt formed by reacting hydroxyethyl cellulose with a trimethyl ammonium substituted epoxide, and has a Mw of about 350,000 and a charge density of 0.7 meq/g.
Example 9—Polyquaternium-10/JR 125, which is a polymeric quaternary ammonium salt formed by reacting hydroxyethyl cellulose with a trimethyl ammonium substituted epoxide, and has a Mw of 80,000 and a charge density of 1.25 meq/g.

The granulated foam control compositions of Examples 7 to 9 were tested for foam in the wash and in the rinse by the test protocol described above. The results are shown in Table 2 below. The wash suds index is the foam height in the wash expressed as a percentage of that given by detergent alone. The rinse suds index is the same as the 'rinse surface coverage' described above.

TABLE 2

|  | Example | | |
|---|---|---|---|
|  | 7 | 8 | 9 |
| Wash Suds Index | 83% | 79% | 66% |
| Rinse Suds Index | 50% | 50% | 25% |
| Mw of cationic polymer | 800,000 | 300,000-400,000 | 80,000 |
| Charge density (meq/g) | 1.25 | 0.7 | 1.25 |

As can be seen from Table 2, the granulated foam control compositions of Examples 7 to 9 all allowed foam formation in the wash with some suppression of foam in the rinse.

The invention claimed is:

1. A granulated foam control composition comprising
(A) a foam control agent comprising
   (i) a polydiorganosiloxane fluid comprising units of the formula

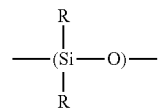

where each group R is independently the same or different and is selected from the group of an alkyl group having from 1 to 36 carbon atoms, an aryl group, and an aralkyl group having up to 36 carbon atoms, wherein the mean number of carbon atoms in the groups R is at least 1.3;
   (ii) a hydrophobic filler dispersed in the polydiorganosiloxane fluid; and
   (iii) optionally an organosilicon resin;
(B) an organic additive having a melting point of from 45° C. to 100° C. and comprising a polyol ester which is a polyol fully or partially esterified by carboxylate groups each having from 7 to 36 carbon atoms and which is miscible with the polydiorganosiloxane fluid (A)(i);
(C) a water-soluble particulate inorganic carrier; and
(D) a polymer having a net cationic charge with a net charge density of from about 0.05 to about 12 meq/g and a molecular weight of from about 80,000 to about 4,000, 000, wherein said polymer having a net cationic charge has a cationicity parameter of greater than 50 dalton meq/g.

2. A granulated foam control composition according to claim 1, wherein the polysiloxane fluid (A)(i) is a polysiloxane comprising at least 10% diorganosiloxane units of the formula

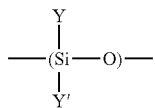

and up to 90% diorganosiloxane units of the formula

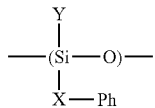

wherein X denotes a divalent aliphatic organic group bonded to silicon through a carbon atom; Ph denotes an aromatic group; Y denotes an alkyl group having from 1 to 4 carbon atoms; and Y' denotes an aliphatic hydrocarbon group having from 1 to 24 carbon atoms.

3. A granulated foam control composition according to claim 1, wherein the polysiloxane fluid (A)(i) is a polysiloxane comprising 50-100% diorganosiloxane units of the formula

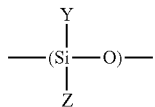

and optionally up to 50% diorganosiloxane units of the formula

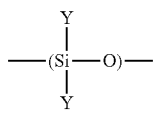

wherein Y denotes an alkyl group having from 1 to 4 carbon atoms and Z denotes an alkyl group having from 6 to 18 carbon atoms.

4. A granulated foam control composition according to claim 1, wherein the mixture of the organic additive (B) and the polydiorganosiloxane fluid (A)(i) has a melting point of from 45° C. to 100° C.

5. A granulated foam control composition according to claim 1, wherein the polyol ester is a glycerol triester substantially fully esterified by carboxylate groups each having from 14 to 22 carbon atoms.

6. A granulated foam control composition according to claim 1, wherein the polyol ester is a monocarboxylate or polycarboxylate in which the carboxylate groups each have from 18 to 22 carbon atoms.

7. A granulated foam control composition according to claim 1, wherein the particulate carrier (C) is selected from the group of sodium sulfate, sodium carbonate and sodium bicarbonate.

8. A granulated foam control composition according to claim 1, wherein the polymer having a net cationic charge (D) has a weight average molecular weight in the range 200,000 to 4,000,000.

9. A granulated foam control composition according to claim 1, wherein the polymer having a net cationic charge (D) is a cationic polysaccharide.

10. A granulated foam control composition according to claim 1, wherein the polymer having a net cationic charge (D) is a synthetic addition polymer of the general structure

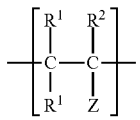

wherein each $R^1$ is independently hydrogen, $C_1$-$C_{12}$ alkyl, substituted or unsubstituted phenyl, substituted or unsubstituted benzyl, $-OR_a$, or $-C(O)OR_a$ wherein $R_a$ is selected from the group of hydrogen, $C_1$-$C_{24}$ alkyl and mixtures thereof; each $R^2$ is independently hydrogen, hydroxyl, halogen, $C_1$-$C_{12}$ alkyl, $-OR_a$, substituted or unsubstituted phenyl, substituted or unsubstituted benzyl, carbocyclic or heterocyclic; and each Z is independently hydrogen, halogen, linear or branched $C_1$-$C_{30}$ alkyl, nitrilo, $N(R_3)_2$ $-C(O)N(R_3)_2$, $-NHCHO$ (formamide), $-OR^3$, $-O(CH_2)_nN(R^3)_2$, $-O(CH_2)_nN^+(R^3)_3X^-$, $-C(O)OR^4$; $-C(O)N-(R^3)_2$, $-C(O)O(CH_2)_nN(R^3)_2$, $-C(O)O(CH_2)_nN^+(R^3)_3X_-$, $-OCO(CH_2)_nN(R^3)_2$, $-OCO(CH_2)_nN^+(R^3)_3X^-$, $-C(O)NH-(CH_2)_nN(R^3)_2$, $-C(O)NH(CH_2)_nN^+(R^3)_3X^-$, $-(CH_2)_nN(R^3)_2$, $-(CH_2)_nN^+(R^3)_3X^-$, a non-aromatic nitrogen heterocycle comprising a quaternary ammonium ion wherein the heterocycle comprising an N-oxide moiety, an aromatic nitrogen-containing heterocycle wherein one or more of the nitrogen atoms is quaternized, or an aromatic nitrogen-containing heterocycle wherein at least one nitrogen is an N-oxide, each $R_3$ being independently hydrogen, $C_1$-$C_{24}$ alkyl, $C_2$-$C_8$ hydroxyalkyl, benzyl or substituted benzyl, each $R_4$ being independently hydrogen, $C_1$-$C_{24}$ alkyl or $-(CH_2-CHR_5-O)_m-R^3$, where $R_5$ is independently hydrogen or $C_1$-$C_6$ alkyl, X is a water soluble anion, and n is from 1 to 6, provided that at least one Z group per molecule is selected from the group of $-O(CH_2)_nN^+(R^3)_3X^-$, $-C(O)OR^4$, $-C(O)N-(R^3)_2$, $-C(O)O(CH_2)_nN(R^3)_2$, $-C(O)O(CH_2)_nN^+(R^3)_3X^-$, $-OCO(CH_2)_nN(R^3)_2$, $-OCO(CH_2)_nN^+(R^3)_3X^-$, $-C(O)NH-(CH_2)_nN(R^3)_2$, $-C(O)NH(CH_2)_nN^+(R^3)_3X$ $-(CH_2)_nN(R^3)_2$, $-(CH_2)_nN^+(R^3)_3X^-$, a non-aromatic nitrogen heterocycle comprising a quaternary ammonium ion wherein the heterocycle comprising an N-oxide moiety, an aromatic nitrogen-containing heterocycle wherein one or more of the nitrogen atoms is quaternized, or an aromatic nitrogen-containing heterocycle wherein at least one nitrogen is an N-oxide.

11. A granulated foam control composition according to claim 1, wherein the foam control agent comprises an organosilicon resin (A)(iii) which is a siloxane resin consisting of monovalent trihydrocarbonsiloxy (M) groups of the formula R"3SiO1/2 and tetrafunctional (Q) groups SiO4/2 wherein R" denotes an alkyl group and the number ratio of M groups to Q groups is in the range of from 0.4:1 to 1.1:1.

12. A method of reducing foam during a rinsing step comprising providing a granulated foam control composition comprising (A) a foam control agent comprising (i) a polydiorganosiloxane fluid comprising units of the formula

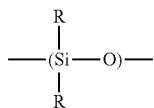

where each group R is independently the same or different and is selected from the group of an alkyl group having from 1 to 36 carbon atoms, an aryl group, and an aralkyl group having up to 36 carbon atoms, wherein the mean number of carbon atoms in the groups R is at least 1.3;

(ii) a hydrophobic filler dispersed in the polydiorganosiloxane fluid; and (vi) optionally an organosilicon resin;

(B) an organic additive having a melting point of from 45° C. to 100° C. and comprising a polyol ester which is a polyol fully or partially esterified by carboxylate groups each having from 7 to 36 carbon atoms;

(C) a water-soluble particulate inorganic carrier; and (D) a polymer having a net cationic charge with a net charge density of from about 0.05 to about 12 meq/g and a molecular weight of from about 80,000 to about 4,000,000, wherein said polymer having a net cationic charge has a cationicity parameter of from about 50 to about 1500 dalton meq/g; and incorporating the granulated foam control composition into a laundry detergent powder.

13. A method of manufacturing a granulated foam control composition comprising:

mixing (A) a foam control agent comprising (i) a polydiorganosiloxane fluid comprising units of the formula

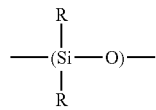

where each group R is independently the same or different and is selected from the group of an alkyl group having from 1 to 36 carbon atoms, an aryl group, and an aralkyl group having up to 36 carbon atoms, wherein the mean number of carbon atoms in the groups R is at least 1.3;

(ii) a hydrophobic filler dispersed in the polydiorganosiloxane fluid; and (iii) optionally an organosilicon resin; and (B) an organic additive having a melting point of from 45° C. to 100° C. and comprising a polyol ester which is a polyol fully or partially esterified by carboxylate groups each having from 7 to 36 carbon atoms; and depositing the mixture of (A) and (B) on a water-soluble particulate inorganic carrier, the mixture of (A) and (B) being in non-aqueous liquid form prior to depositing said mixture on the water-soluble particulate inorganic carrier; and depositing (D) a polymer, having a net cationic charge with a net charge density of from about 0.05 to about 12 meq/g and a molecular weight of from about 80,000 to about 4,000,000, wherein said polymer having a net cationic charge has a cationicity parameter of from about 50 to about 1500 dalton meq/g, on the water-soluble particulate inorganic carrier in conjunction with the mixture of (A) and (B) being deposited on the water-soluble particulate inorganic carrier or after the mixture of (A) and (B) is deposited on the water-soluble particulate inorganic carrier.

14. A method according to claim 13 in which the polymer (D) having a net cationic charge is deposited on the particulate carrier in conjunction with the mixture of (A) and (B), wherein the polymer (D) having a net cationic charge is mixed with the foam control agent (A) and the organic additive (B) prior to being deposited on the particulate carrier.

15. A method according to claim 13 in which the polymer (D) having a net cationic charge is deposited on the particulate carrier in conjunction with the mixture of (A) and (B), wherein the polymer (D) having a net cationic charge is deposited on the particulate carrier simultaneously with deposition of the mixture of (A) and (B).

* * * * *